United States Patent
Gu

(10) Patent No.: US 8,592,078 B2
(45) Date of Patent: Nov. 26, 2013

(54) LITHIUM ION BATTERY

(71) Applicant: Huijun Gu, Dongguan (CN)

(72) Inventor: Huijun Gu, Dongguan (CN)

( * ) Notice: Subject to any disclaimer, the term of this patent is extended or adjusted under 35 U.S.C. 154(b) by 0 days.

(21) Appl. No.: 13/689,792

(22) Filed: Nov. 30, 2012

(65) Prior Publication Data

US 2013/0084475 A1 Apr. 4, 2013

Related U.S. Application Data

(63) Continuation-in-part of application No. 13/234,166, filed on Sep. 16, 2011, now abandoned, which is a continuation of application No. PCT/CN2010/078524, filed on Nov. 8, 2010.

(30) Foreign Application Priority Data

Jun. 11, 2010 (CN) .......................... 2010 1 0197892

(51) Int. Cl.
*H01M 2/08* (2006.01)
(52) U.S. Cl.
USPC .......................................... 429/174; 429/164

(58) Field of Classification Search
None
See application file for complete search history.

(56) References Cited

U.S. PATENT DOCUMENTS

| | | | |
|---|---|---|---|
| 6,262,879 B1 * | 7/2001 | Nitta et al. .................... | 361/517 |
| 2008/0171235 A1 * | 7/2008 | Seo et al. ......................... | 429/7 |
| 2009/0297946 A1 * | 12/2009 | Yue et al. ..................... | 429/211 |

* cited by examiner

*Primary Examiner* — Patrick Ryan
*Assistant Examiner* — Wyatt McConnell
(74) *Attorney, Agent, or Firm* — Matthias Scholl P.C.; Matthias Scholl

(57) ABSTRACT

A lithium ion battery including a lithium ion battery core, a cylindrical aluminum shell, a positive guide needle of the anode, a negative guide needle of the cathode, a rubber seal having a circular recess in the outside of the side wall, and a sealing band. The battery core is arranged within the shell. The positive and negative guide needles are led out from under the seal. The battery core together with the rubber seal is sealed in the shell via the sealing band which is molded from an insulated moldable material by rolling. The sealing band is applied only to the top portion of the shell, the side wall of the seal, and the edge of the top wall of the seal. The bottom wall of the shell is provided with a pressure relief valve.

7 Claims, 4 Drawing Sheets

LITHIUM ION BATTERY

CROSS-REFERENCE TO RELATED APPLICATIONS

This application is a continuation-in-part of U.S. Ser. No. 13/234,166 with a filing date of Sep. 16, 2011, now pending, which is a continuation of International Patent Application No. PCT/CN2010/078524 with an international filing date of Nov. 8, 2010, designating the United States, now pending. This application further claims foreign priority benefits to Chinese Patent Application No. 201010197892.0, filed on Jun. 11, 2010. The contents of all of the aforementioned specifications as originally filed, including all amendments thereto, are incorporated herein by reference. Inquiries from the public to applicants or assignees concerning this document should be directed to: MATTHIAS SCHOLL P.C., ATTN.: DR. MATTHIAS SCHOLL, ESQ., 14781 MEMORIAL DRIVE, SUITE 1319, HOUSTON, TEX 77079.

BACKGROUND OF THE TECHNOLOGY

1. Field of the Invention

The invention relates to the field of lithium ion battery technology, and more particularly to a lithium ion battery.

2. Description of the Related Art

Conventionally, a cylindrical lithium ion battery generally uses rigid packaging materials, such as stainless steel, to form a metal shell for containing the battery core, and a rubber seal is used to confine the battery core in the shell by sealing the opening of the shell. Since lithium ion batteries are likely to produce gas in the case of damage, overcharge, and high temperature, a gas outlet is commonly arranged at an anode head thereof to avoid explosion caused by delaying gas release, which makes structures of the anode end of the battery complicated. In some other cases, a pressure relief valve is disposed in the bottom end wall of the metal shell. However, the pressure relief valve disposed in the bottom end wall of the metal shell is covered with a positive terminal, which somehow delays gas release when the pressure in the battery is above a certain threshold.

In addition, the anode of a conventional cylindrical lithium ion battery is usually a protruded head and the cathode thereof is a flat bottom, and the anode and cathode of a conventional lithium battery are disposed on two different ends. In use, cylindrical lithium ion batteries are often connected in series to provide high capacity and high power of voltage and current for electrical appliances. If they are connected in parallel, a dedicated battery box is required. Thus, it is troublesome and difficult to meet varied requirements under different occasions either in series or in parallel.

In addition, for sealing and confining the battery assembly including the battery core, the metal shell, and the rubber seal, a cover is conventionally formed over the cylindrical side wall of the metal shell, the peripheral edge of the bottom end wall of the metal shell, and the peripheral edge of the top surface of the rubber seal; or a cap is formed over the top surface of the rubber seal and the top portion of the cylindrical side wall of the metal shell. To have the required sealing effect, the cover must be appropriately compressed to decrease the air clearance between the cover and the surfaces it covers in addition to being appropriately compressed to conform to the surfaces it covers. To reach the required sealing effect and to stably confine the battery assembly, the cap must be welded to top portion of the cylindrical side wall of the metal shell and must be appropriately compressed to decrease the air clearance between the cap and the surfaces it covers in addition to being appropriately compressed to conform to the surfaces it covers. Thus, the sealing effect of the conventional sealing structures for the battery is inadequate because space always exists between the cover (or cap) and the surfaces it covers. Besides, the processes for constructing the conventional sealing structures are complicated and demanding so that the production cost of the battery is high.

SUMMARY OF THE INVENTION

In view of the above-described problems, it is one objective of the invention to provide a cylindrical lithium ion battery comprising sealing structures for perfectly sealing and confining the battery assembly including the metal shell, the battery core, and the rubber seal and for simplifying production cost of the battery. The battery comprises a pressure relief valve at the bottom of the metal shell.

To achieve the above objective, in accordance with one embodiment of the invention, there provided is a lithium ion battery comprising a lithium ion battery core; a cylindrical aluminum shell comprising a cylindrical side wall, an opening, and a bottom wall; a positive guide needle of anode; a negative guide needle of cathode; a rubber seal comprising a top wall, a cylindrical wall, and a circular recess being disposed in the cylindrical wall; and a sealing band; wherein the lithium ion battery core is arranged within the cylindrical aluminum shell; the positive guide needle of anode and the negative guide needle of cathode are led out from under the rubber seal; the rubber seal is disposed above the battery core and disposed in the opening of the shell whereby the bottom portion of the cylindrical wall of the rubber seal is disposed within the opening of the shell and within the top portion of the cylindrical side wall of the shell; the circular recess is disposed in the portion of the cylindrical wall of the rubber seal which extend out the shell; the lithium ion battery core, the cylindrical aluminum shell, and the rubber seal are combined together and sealed by the sealing band; the sealing band covers over the top portion of the cylindrical side wall of the shell, the portion of the cylindrical wall of the rubber seal protruding out of the shell (including the circular recess), and the peripheral edge of the top wall of the rubber seal; the sealing band is made of an insulated moldable material and is molded by rolling; and a bottom wall of the cylindrical aluminum shell is provided with a pressure relief valve.

In a class of this embodiment, the positive guide needle of anode and the negative guide needle of cathode are led out in the same direction and are respectively riveted to an anode ear and a cathode ear.

In a class of this embodiment, the end cover is a rubber plug.

In a class of this embodiment, the pressure relief valve is X-shaped or a Y-shaped.

Advantages of the invention are summarized below. The lithium ion battery has a simple structure, convenient use, and high safety. First, the sealing structure for the battery comprises only a circular recess disposed in the cylindrical wall of the rubber seal and a sealing belt made of an insulated moldable material. Furthermore, the sealing belt is formed by rolling molding. Therefore, constructing the sealing structure for the battery is very convenient and cost saving. In addition, because the sealing belt is formed by rolling molding from an insulated moldable material, there is no space between the sealing belt and the surfaces it covers, so that the battery is air-tight and the sealing quality is extremely high. The sealing structure applied to the battery assembly makes it possible for high efficient production and reliable sealing quality. Second, since the sealing band made by rolling molding from a moldable material is tightly attached to the surfaces it covers, the rubber seal and the battery core are perfectly sealed and stably confined in the aluminum shell by only applying the sealing band to the top portion of the cylindrical side wall of the shell, the cylindrical wall of the rubber seal protruding out of the shell (including the circular recess), and the peripheral edge of the top wall of the rubber seal. There is no need to apply the sealing band to the entire cylindrical side wall of the shell and to the peripheral edge of the bottom wall of the shell. In addition, there is no need to weld the sealing band onto the surfaces it covers. Third, the circular recess effectively improves the adhesive force between the sealing band and the surfaces it covers, whereby the sealing quality and the stability in combination with the assembly is further improved. Fourth, the pressure relief valve arranged at the bottom of the aluminum shell which is not covered by other structures can effectively release gases produced by the lithium ion battery under various working conditions to avoid an explosion.

Figure 1:
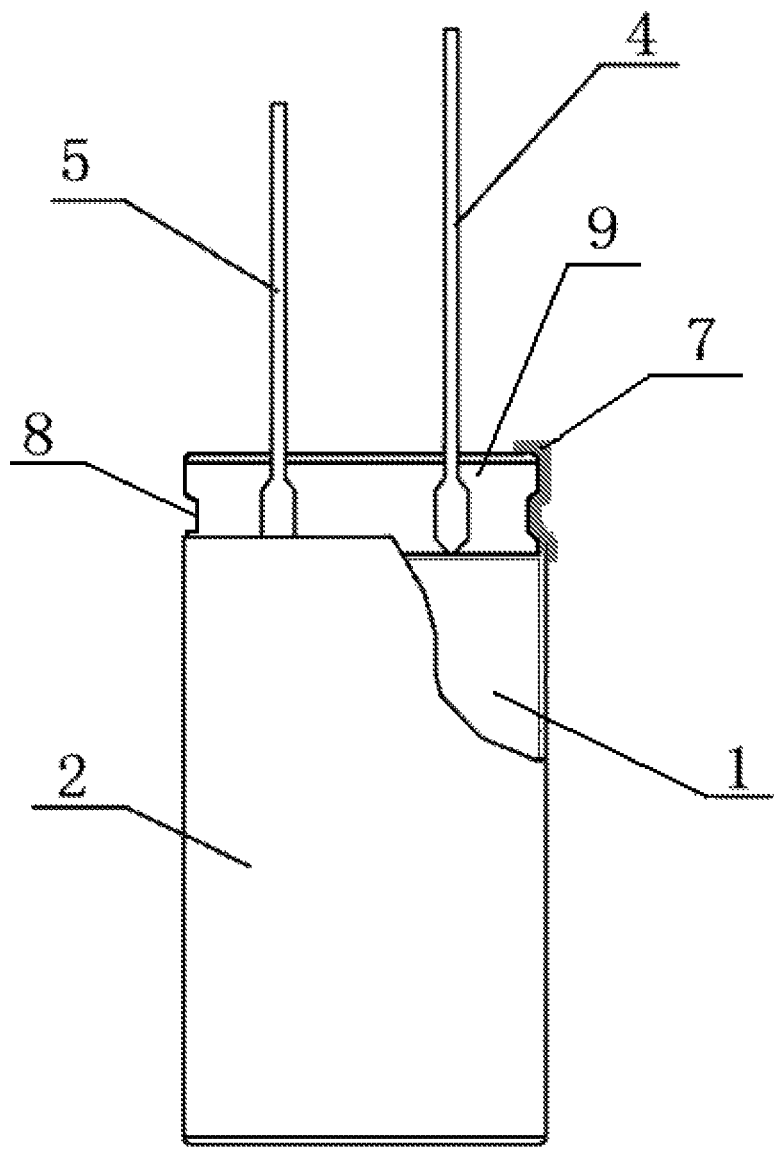
FIG. 1 is a schematic diagram of a lithium ion battery in accordance with one embodiment of the invention.

In the drawings, the following reference numbers are used: lithium ion battery core 1, cylindrical aluminum shell 2, positive guide needle of anode 4, negative guide needle of cathode 5, pressure relief valve 6, sealing band 7, circular recess 8, rubber plug 9, anode ear 10, and cathode ear 11.

DETAILED DESCRIPTION OF THE EMBODIMENTS

The invention is explained in further detail below with the aid of the examples and attached drawings.

Figure 2:
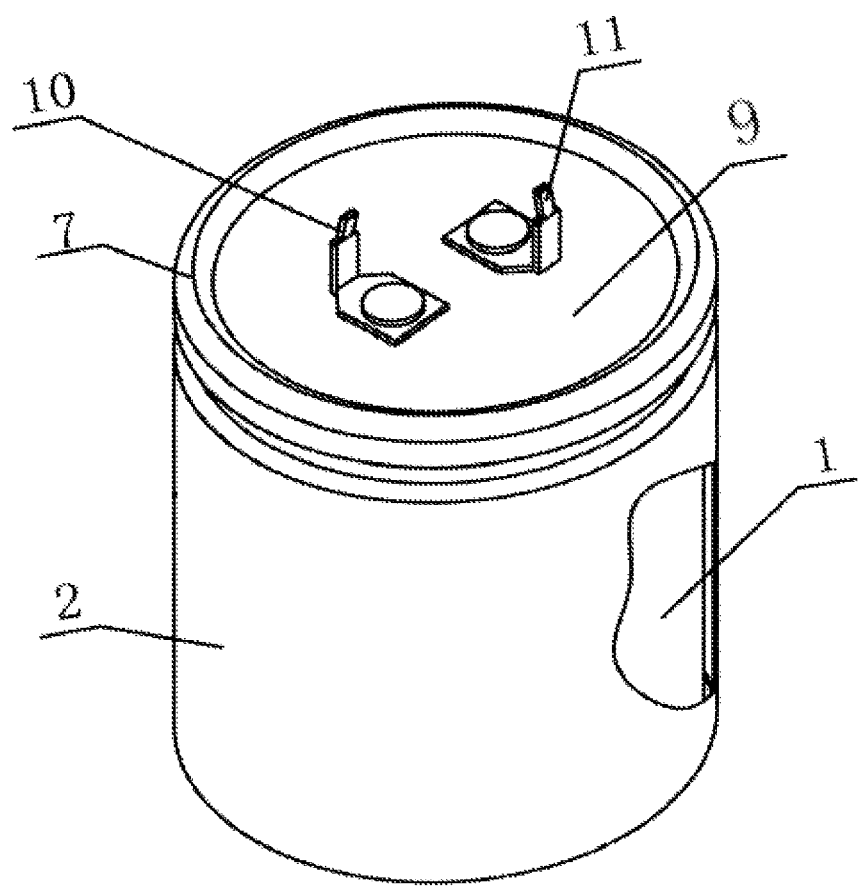
FIG. 2 is a schematic diagram of guide needles riveted to an anode ear and a cathode ear in accordance with one embodiment of the invention.

As shown in FIGS. 1 and 2, a lithium ion battery comprises a lithium ion battery core 1. The lithium ion battery core 1 is arranged within a cylindrical aluminum shell 2. A positive guide needle of anode 4 and a negative guide needle of cathode 5 are led out from the battery via a rubber seal 9. The rubber seal 9 is disposed above the batter core 1, and the bottom portion of the cylindrical wall of the rubber seal 9 is disposed in the opening of the shell 2 so that the upper portion of the cylindrical side wall of the shell 2 surrounds the bottom portion of the cylindrical wall of the rubber seal 9.

A circular recess 8 is disposed in the portion of the cylindrical wall of the rubber seal 9 which protrudes out of the shell 2. The lithium ion battery core 1 together with the rubber seal 9 is sealed in the cylindrical aluminum shell 2 through a sealing band 7 that is molded by rolling from an insulated moldable material. The moldable insulated material for forming the sealing band 7 is an insulated ceramic material or a polymeric material. The moldable insulated material for forming the sealing band 7 is different from the material for forming the aluminum shell 2. The sealing band 7 is applied to the top portion of the top portion of the cylindrical side wall of the shell 2, the portion of the cylindrical wall of the rubber seal 9 extending out from the shell 2, the circular recess 8, and the peripheral edge of the top wall of the rubber seal 9. The bottom wall of the cylindrical aluminum shell 2 is provided with the pressure relief valve 6. The positive guide needle of anode 4 and the negative guide needle of cathode 5 are led out in the same direction from under the rubber seal 9 and are respectively riveted to an anode ear 10 and a cathode ear 11. The top end of the cylindrical aluminum shell 2 is fit with the rubber seal 9.

Figure 3:
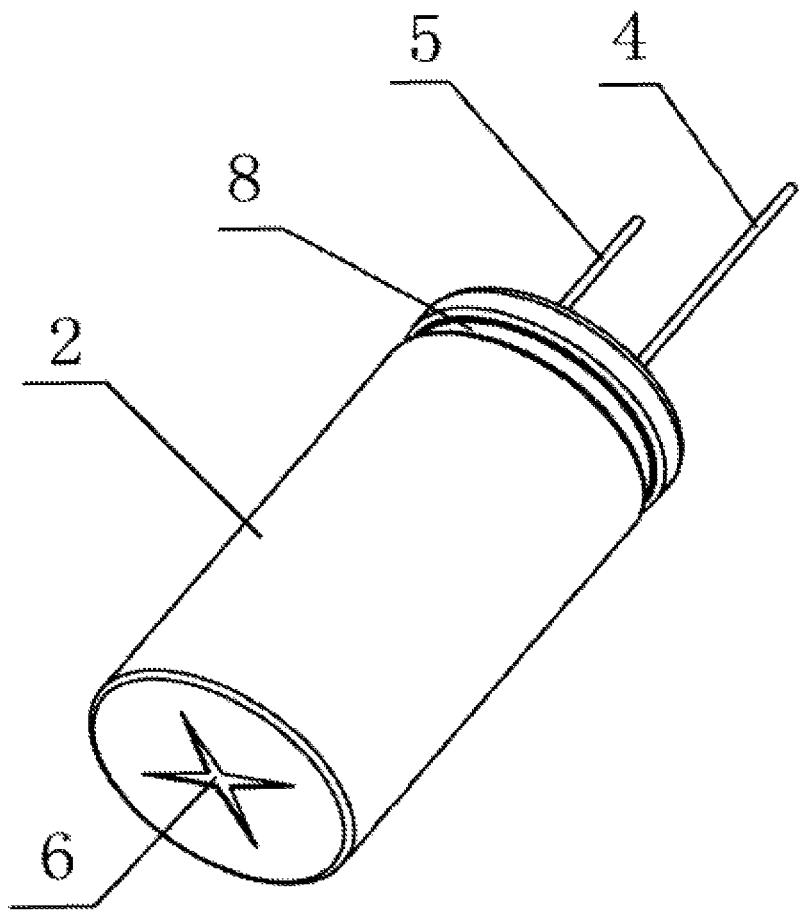
FIG. 3 is a schematic diagram of a pressure relief valve at the bottom of a cylindrical aluminum shell in accordance with one embodiment of the invention.
Figure 4:
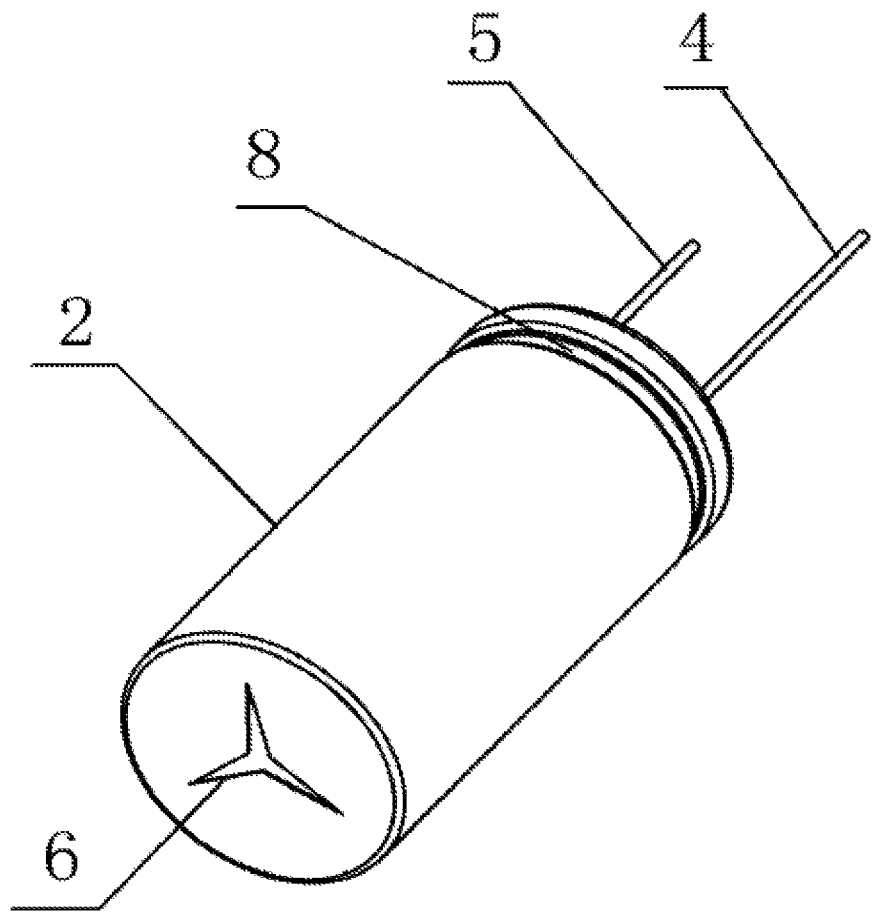
FIG. 4 is another schematic diagram of a pressure relief valve at the bottom of a cylindrical aluminum shell in accordance with one embodiment of the invention.

As shown in FIGS. 3 and 4, a pressure relief valve installed at the bottom plane of the cylindrical aluminum shell 2 is either X-shaped or Y-shaped.

In accordance with the invention, the lithium ion battery core 1 is sealed in the cylindrical aluminum shell 2 by disposing the rubber seal 9 in the opening of the shell 2. The battery core 1, the top portion of the shell 2, and the rubber seal 9 are sealed by the sealing band 7. In addition, the battery core 1 and the rubber seal 9 are confined in the shell 2 by the sealing band 7. The positive guide needle of the anode 4 and negative guide needle of the cathode 5 are led out in the same direction from the battery through the rubber plug 9. The sealing band 7 and the girdling band 8, molded using a rolling sealing device, are applied to the lithium ion battery which comprises lead-out anode and cathode at the same end. The lithium ion battery of the invention has the advantages of simple structure, high efficient production, and reliable sealing quality.

The lithium ion battery of the invention is made by first putting the positive and negative guide needles 4, 5 of the already wound lithium ion battery core 1 through the rubber plug 9, or making the positive and negative guide needles 4, 5 riveted to the anode ear 10 and the cathode ear 11 through the rubber seal plug 9, then sealing the lithium ion battery core 1 in the cylindrical aluminum shell 2 by plugging the rubber seal 9 in the opening the shell 2, and finally sealing the cylindrical aluminum shell 2 containing the lithium ion battery core 1 together with the rubber plug 9 by forming a sealing band 7 covering the top portion of the cylindrical wall of the shell 2, the cylindrical side wall of the rubber plug 9, the recess 8, and the edge of the top surface of the rubber plug 9 by using a rolling sealing device, to complete the whole production process of the lithium ion battery.

With respect to different electrical appliances, different connection methods can be adopted for the lithium ion battery. The positive and negative guide needles 4, 5 led out in the same direction from under the rubber plug 9, or the riveted anode ear 10 and the cathode ear 11 both being disposed on the rubber plug 9, all can be conveniently connected with an electrical appliance either in series or in parallel to provide the lithium ion battery with high capacity, high power, and high voltage for the electrical appliance.

The pressure relief valve 6, either in an X shape or a Y shape or other shapes with the same purpose, is notched at the bottom of the cylindrical aluminum shell 2. The cylindrical aluminum shell 2 is not covered by other structures. When the lithium ion battery produces gas due to damage, overcharge, or high temperature, such gas can be released from the gas outlet of the pressure relief valve 6 in time to prevent the lithium ion battery from exploding, thereby improving the safety and reliability of the battery.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A lithium ion battery, comprising:
   a) a battery core;
   b) a cylindrical shell, said cylindrical shell comprising a bottom wall, an opening, and a first cylindrical side wall having an upper portion and a lower portion; said upper portion being disposed around said opening;
   c) a positive guide needle of an anode;
   d) a negative guide needle of a cathode;
   e) a rubber plug, said rubber plug comprising a top surface, and a second cylindrical side wall having an inserting portion, a protruding portion, and a circular recess;
   f) a sealing band; and
   g) a pressure relief valve;
wherein:
   said cylindrical shell is made of aluminum;
   said battery core is arranged within said cylindrical shell;
   said rubber plug is disposed above the said battery core;
   said inserting portion is disposed in said opening and said protruding portion extends out of said shell;
   said circular recess is disposed in said protruding portion;
   said positive guide needle of the anode and said negative guide needle of the cathode are led out from under said rubber plug;
   said battery core, said rubber plug, and said cylindrical shell are joined together through said sealing band which is molded by rolling;
   said sealing band is applied to said upper portion, said protruding portion, said recess, and an peripheral edge of said top surface;
   said sealing band is made of an insulated moldable material; and
   said pressure relief valve is disposed on said bottom wall.

2. The lithium ion battery of claim 1, wherein the positive guide needle of anode and the negative guide needle of cathode are respectively riveted to an anode ear and a cathode ear.

3. The lithium ion battery of claim 1, wherein said pressure relief valve is X-shaped or Y-shaped.

4. A lithium ion battery, comprising:
   a) a battery core;
   b) a cylindrical shell, said cylindrical shell comprising a bottom wall, an opening, and a first cylindrical side wall having an upper portion and a lower portion; said upper portion being disposed around said opening;
   c) a positive guide needle of an anode;
   d) a negative guide needle of a cathode;
   e) a rubber plug, said rubber plug comprising a top surface, and a second cylindrical side wall having an inserting portion, a protruding portion, and a circular recess;
   f) a sealing band; and
   g) a pressure relief valve;
wherein:
   said cylindrical shell is made of aluminum;
   said battery core is arranged within said cylindrical shell;
   said rubber plug is disposed above the said battery core;
   said inserting portion is disposed in said opening and said protruding portion extends out of said shell;
   said circular recess is disposed in said protruding portion;
   said positive guide needle of the anode and said negative guide needle of the cathode are led out from said rubber plug;
   said battery core, said rubber plug, and said cylindrical shell are joined together through said sealing band which is molded by rolling;
   said sealing band is only applied to said upper portion, said protruding portion, said recess, and an peripheral edge of said top surface, and said sealing band is not applied to said lower portion and said bottom wall;
   said sealing band is made of an insulated moldable material; and
   said pressure relief valve is disposed on said bottom wall.

5. The lithium ion battery of claim 4, wherein the positive guide needle of anode and the negative guide needle of cathode are respectively riveted to an anode ear and a cathode ear.

6. The lithium ion battery of claim 4, wherein said pressure relief valve is X-shaped or Y-shaped.

7. In a method for making a lithium ion battery, the battery comprising: a) a battery core; b) a cylindrical shell for containing said battery core; said cylindrical shell being made of aluminum; and said cylindrical shell comprising a bottom wall, an opening, and a first cylindrical side wall having an upper portion being disposed around said opening and a lower portion; c) a positive guide needle of an anode; d) a negative guide needle of a cathode; e) a rubber plug for confining said battery core in said cylindrical shell; said positive guide needle of the anode and said negative guide needle of the cathode being led out from under said rubber plug; said rubber plug comprising a top surface, and a second cylindrical side wall having an inserting portion, a protruding portion, and a circular recess; said inserting portion being disposed in said opening; and said protruding portion extending out of said cylindrical shell; f) a sealing band; and g) a pressure relief valve; the improvement comprising:
   installing a pressure relief valve in said bottom wall;
   making said circular recess in said protruding portion;
   forming said sealing band by rolling molding from an insulated material; and
   placing said sealing band only over said top portion, said protruding portion, said circular recess, and an peripheral edge of said top surface, but not over said lower portion and said bottom wall.

* * * * *